March 23, 1965 L. T. COLLIN 3,174,275
ARRANGEMENT IN TWO-STROKE CYCLE COMBUSTION ENGINES
Filed Jan. 14, 1963 2 Sheets-Sheet 1

INVENTOR.
LARS THORBJÖRN COLLIN
BY
Pierce, Scheffler & Parker
his Attorneys

March 23, 1965 L. T. COLLIN 3,174,275
ARRANGEMENT IN TWO-STROKE CYCLE COMBUSTION ENGINES
Filed Jan. 14, 1963 2 Sheets-Sheet 2

INVENTOR
LARS THORBJÖRN COLLIN
BY Pierce Scheffler & Parker
his ATTORNEYS

United States Patent Office 3,174,275
Patented Mar. 23, 1965

3,174,275
ARRANGEMENT IN TWO-STROKE CYCLE
COMBUSTION ENGINES
Lars Thorbjörn Collin, Goteborg, Sweden, assignor to Aktiebolaget Gotaverken, Goteborg, Sweden, a corporation of Sweden
Filed Jan. 14, 1963, Ser. No. 251,237
Claims priority, application Sweden, Jan. 18, 1962
522/62
2 Claims. (Cl. 60—13)

This invention relates to an arrangement of, and a method of operating, two-stroke cycle combustion engines, especially for propulsion of ships, which are provided with a scavenging and supercharging compressor (main compressor) driven by an exhaust gas turbine and with an auxiliary compressor driven by any suitable prime mover and working in parallel with the main compressor. For cooperation with the exhaust gas turbine the main compressor is devised as a rotary dynamic compressor in which the risk of so called surging has to be absolutely avoided. Surging is a serious matter especially during start and in the low-speed range, but may of course also occur in case of occasional changes in the conditions of operation of the compressor. The object of the invention is to provide an arrangement which makes it possible rapidly to increase the speed of the turbo set and, then always to keep the turbo set on the right side of the surge limit line while maintaining a favourable efficiency. Generally, this object is attained by the fact that the air duct between the main compressor and the engine is connected to controllable branch ducts adapted to communicate one with the atmosphere and the other one with the exhaust duct between the engine and the turbine. Preferably, a first non-return valve is provided in the branch duct between the main air duct and the exhaust duct, and a second non-return valve is provided in the main duct between the connecting point of said branch duct and the engine. The branch ducts are suitably controlled by a multi-way valve which is adapted to put one or both branch ducts in communication with the air duct and to disconnect the branch ducts entirely from the air duct. In accordance with a further development of the invention, a two-way valve may be provided in the exhaust duct between the engine and the gas turbine such that the main compressor can be entirely put out of operation by disconnecting the turbine from the engine. Further, means known per se may be provided to put the auxiliary compressor out of operation when the main compressor has attained its full speed.

Figure 1:
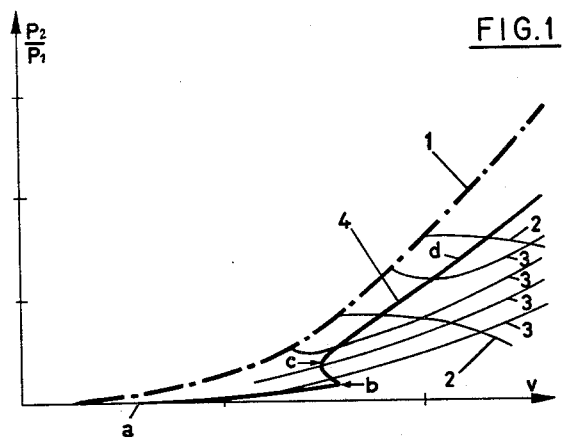
Figure 2:
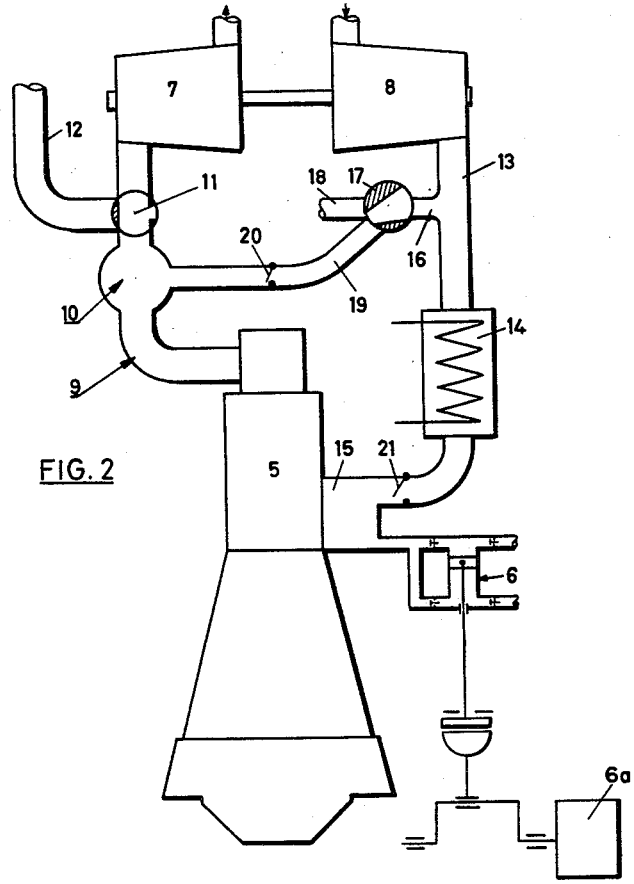

In the annexed drawing there is illustrated an example of an embodiment of the invention as applied to a large marine engine. FIG. 1 shows a surge limit diagram, FIG. 2 is a schematic view of the main components of the engine plant and FIGS. 3a–3d inclusive schematically illustrate the several driving conditions hereinafter discussed.

Figure 3A:
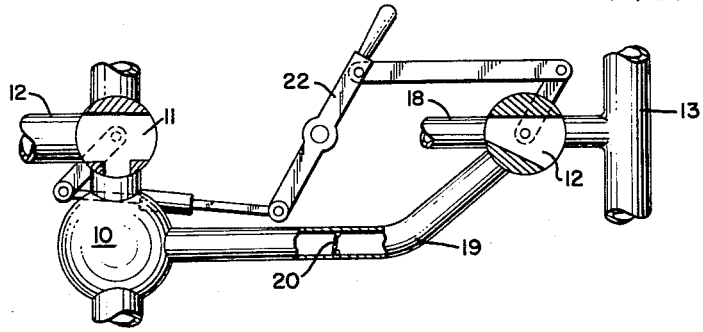
Figure 3B:
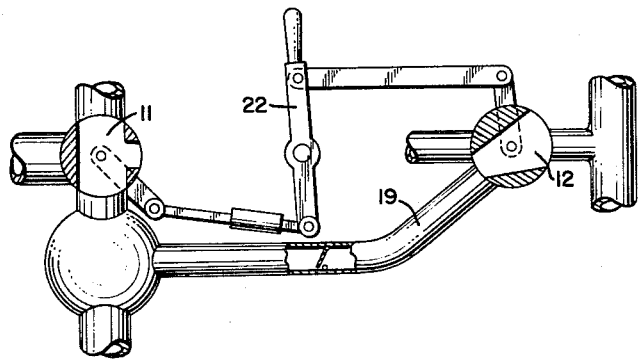
Figure 3C:
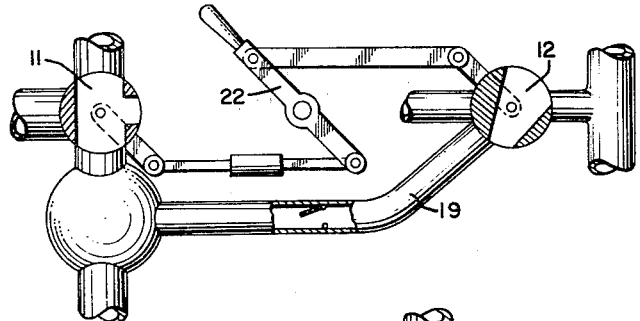
Figure 3D:
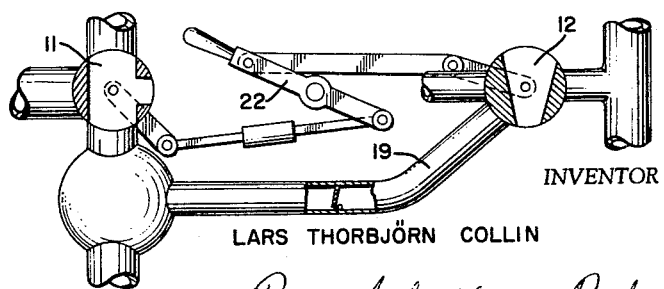

FIG. 3a shows the adjustment of the valves 11 and 17 during starting: the exhaust is discharged to atmosphere and also the main compressor is connected to atmosphere;

FIG. 3b shows the adjustment of the valves during speeding up: valve 11 is switched over so that the exhaust is delivered to the turbine and valve 17 is adjusted to admit air from the main compressor into the duct 19;

FIG. 3c shows the adjustment of the valves 11 and 17 immediately before the interruption of the connection between the main air duct and the cross connection duct; and FIG. 3d shows the adjustment of the valves during normal operation when the whole amount of air is delivered by the main compressor.

Referring to FIG. 1, the abscissa represents the volume (V) of the air delivered by the compressor and the ordinate represents the ratio of the delivery pressure ($P_2$) to the inlet pressure ($P_1$) of the compressor. The chain-dotted thick line 1 is the so called surge limit line that denotes the volume which at a certain pressure ratio is in any case delivered by the compressor within the speed range indicated by the thin full lines 2. The thin full lines 3 indicate the compressor efficiency for various conditions of operation. Both types of curves 2 and 3 represent higher values of the speed and the efficiency, respectively, with increasing distance from the axis of abscissa. It is of course desirable, that the real output capacity of the compressor indicated by the thick full line 4 be as high as possible with respect to the efficiency curves without coming close to the surge limit line with the risk that at an occasional change of operation of the plant the surge limit line will be overstepped which would result in an unstable operation without air delivery.

The power plant comprises a two-stroke cycle combustion engine 5 and an auxiliary scavenging compressor 6 driven thereby or by an independent source of power 6a. The plant further comprises an exhaust gas turbine 7 and a main compressor 8 driven by the turbine. The engine exhaust flows through a duct 9 into a receiver 10 common to a plurality of cylinders. Between the cylinders and the turbine there is provided a two-way valve 11 through which the engine exhaust can be discharged to atmosphere through a duct 12. In FIGS. 3a–3d, a known form of actuating mechanism is represented at 22.

Connected to the delivery side of the main compressor is a main air duct 13 in which a scavenging-air cooler 14 is inserted and which communicates with a scavenging air chamber 15 common to the main compressor and the auxiliary compressor and directly connected to the engine. The main air duct communicates through a connection 16 with a multi-way valve 17 adapted to put the main air duct in communication either with a branch duct 18 exhausting to atmosphere or with a by-pass duct 19 communicating with the exhaust receiver 10. The multi-way valve is also adapted to connect both branch ducts 18, 19 with the main air duct or to disconnect both branch ducts from the main duct. In the by-pass duct there is provided a first non-return valve 20 and in the main air duct there is provided a second non-return valve 21 beyond the connecting point of the branch duct 16.

The compression ratio of the auxiliary compressor driven by the engine is such that the delivery valves of this compressor will not open if the main compressor provides for a sufficiently high pressure in the scavenging-air chamber 15, resulting in an automatic disconnection of the auxiliary compressor which at normal load on the main engine merely requires an input corresponding to the friction losses.

As regards the operation of the main compressor it is possible, due to the arrangement described, to have this compressor always working on the right side of, and at a safe distance from, the surge limit line.

The way of proceeding in starting the plant and increasing the speed to the normal speed of operation including all conditions of operation is as follows. When the engine is to be started (FIG. 3a) the two-way valve is adjusted such that the engine exhaust is discharged to atmosphere requiring minimum scavenging work. The whole amount of scavenging air required is delivered by the auxiliary compressor. As soon as the engine has passed the starting range and operates within the limits of the lower mean load the valve 11 is adjusted such that the engine exhaust is admitted to the turbine. At the same time the multi-way valve 17 is adjusted such as to connect the main compressor to atmosphere. In this position in which a certain pressure prevailing in the exhaust duct drives the turbine, the non-return valve 20 prevents the engine exhaust from flowing to the main air duct. Due to the pressure exerted by the air delivered from the auxiliary compressor the non-return valve 21 interrupts the communication between the scavenging-air chamber and the main air duct. The energy contained in the engine exhaust can now completely be utilized for accelerating the turbo set. As will best be seen from the first part of the curve 4 in the diagram shown in FIG. 1 the speed will be rapidly increased, whereas the pressure of the air passing through the compressor will be increased to a very low degree only.

As soon as the turbo set attains a certain stable speed and a power output can be expected (FIG. 3b) the valve 17 is adjusted such that the communication with atmosphere through the branch duct 18 is gradually throttled and air is admitted into the duct 19. As soon as the pressure in the main air duct has a value higher than the pressure in the exhaust receiver 10 which last-named pressure is slightly lower than the pressure in the scavenging-air cooler 15, the non-return valve 20 will open whereas the non-return valve 21 will remain closed. Now air from the main compressor flows into the exhaust receiver and therefrom through the turbine which is dimensioned and calculated for the amounts of gas available in normal operation. The lower amount available in the actual range of mean load does not fill up the passages between the turbine blades to an extent resulting in an appreciable turbine efficiency. However, since air from the compressor is passed through the turbine, an increased volume will flow through the turbine and the passages between the blades will be filled to a higher degree resulting in that the turbine efficiency will be seemingly higher in spite of the fact that the engine output is not increasing. This condition is illustrated by the curved middle part of the curve 4 which shows how the pressure of the air increases in conjunction with a certain reduction of the volume delivered. Were it not for the switch-over connection, especially the first connection to atmosphere of the delivery side of the compressor, a main part of the turbine output would have to be used for building up a pressure in the main air duct, resulting not only in a delay of acceleration but more seriously in the fact that the compressor from the beginning would have worked on the "wrong" side of the surge limit line. In this case, a great amount of additional power would then be required to have the compressor work on the safe side of the surge limit line, and during a considerable time interval no definite control of the air delivery would be possible.

In good time before the risk of contact with the surge limit line occurs the interruption of the connection between the main air duct and the by-pass duct is initiated (FIG. 3c) resulting in a successive increase of pressure. Provided that the output of the engine is increased at the same time, a pressure will be built up in the scavenging-air duct and will finally open the non-return valve 21. Thereupon air will be supplied to the engine both from the main compressor and the auxiliary compressor. Upon continued increase of the engine output the pressure and volume of the air delivered by the main compressor will increase very rapidly and after some time the auxiliary compressor will be disconnected automatically and the main compressor will supply the whole amount of air required (FIG. 3d). As indicated by the latter part of the curve 4 the main compressor will then all the time work at a safe distance from the surge limit line and within a high range of efficiency.

The above described and illustrated arrangement is to be considered merely as an example of the invention the details of which may be changed in various manners within the scope of the appending claims. The valves 11 and 17 are only diagrammatically illustrated to explain their desired functions and their practical design is to be determined, inter alia, with regard to suitable flow conditions and possibilities of sufficiently rapid adjusting movements. On starting and speeding the engine up to the speed of operation the time intervals during which the branch ducts 18 and 19, respectively, are entirely open can be very short, whereas if the engine operates under partial load for a longer period they have, of course, to be open for a corresponding time. The valves may be interconnected so as to move in a predetermined relationship. If desired, they may be actuated by the fuel control or another member which is responsive to the condition of operation of the engine. The auxiliary compressor 6 may be of any suitable conventional type and may be driven by an independent source of power provided with suitable means for disconnecting the auxiliary compressor automatically or manually in response to the actual condition of operation of the main engine.

What I claim is:

1. In combination a two-stroke cycle internal combustion engine, an exhaust gas turbine and an exhaust duct between said engine and said turbine;
   a scavenging and supercharging main compressor driven solely by said turbine;
   a first air duct between the main compressor and the engine;
   an auxiliary piston compressor;
   means for driving said auxiliary compressor independently of said main compressor;
   a second air duct connecting said auxiliary compressor to the engine in parallel to said first air duct;
   a cross connection duct between said first air duct and the exhaust duct, said cross connection duct also having a branch duct to the atmosphere;
   a multiway valve in said cross connection duct to connect at will said first air duct with the atmosphere and alternatively with the exhaust duct, respectively;
   a first non-return valve in said cross connection duct; and
   a second non-return valve in said first air duct between said cross connection duct and the engine.

2. In combination a two-stroke cycle internal combustion engine, an exhaust gas turbine and an exhaust duct between said engine and said turbine;
   a branch duct from said exhaust duct to the atmosphere;
   a two way valve in said branch duct;
   a scavenging and supercharging main compressor driven by said turbine;
   a first air duct between the main compressor and the engine;
   an auxiliary piston compressor;
   means for driving said auxiliary compressor independently of said main compressor;
   a second air duct connecting said auxiliary compressor to the engine in parallel to said first air duct;
   a cross connection duct between said first air duct and the exhaust duct, said cross connection also having a branch connection to the atmosphere;
   a multiway valve in said cross connection duct to connect at will said first air duct with the atmosphere and alternatively with the exhaust duct, respectively;
a first non-return valve in said cross connection duct;
a second non-return valve in said first air duct between said cross connection duct and the engine;
and a common actuating mechanism for operating said two way valve and said multiway valve according to a predetermined program during start and low load of the engine.

References Cited by the Examiner

UNITED STATES PATENTS 2,296,268 9/42 Buchi _____ 123—119 X
2,633,698 4/53 Nettel _____ 60—13

RICHARD B. WILKINSON, *Primary Examiner.*

JULIUS E. WEST, *Examiner.*